United States Patent [19]

Inaba et al.

[11] 4,396,987

[45] Aug. 2, 1983

[54] MACHINE TOOL AND ROBOT CONTROL APPARATUS

[75] Inventors: Hajimu Inaba; Hideo Miyashita, both of Hino; Shinsuke Sakakibara, Kunitachi; Atsushi Watanabe, Yokohama, all of Japan

[73] Assignee: Fanuc Ltd., Tokyo, Japan

[21] Appl. No.: 172,300

[22] Filed: Jul. 25, 1980

[30] Foreign Application Priority Data

Jul. 30, 1979 [JP] Japan .............................. 54-97061

[51] Int. Cl.³ ...................... G06F 15/46; G05B 19/18; G05B 19/42
[52] U.S. Cl. ................................. 364/513; 364/191; 364/474
[58] Field of Search ............... 364/191, 192, 193, 474, 364/513; 318/568

[56] References Cited

U.S. PATENT DOCUMENTS

| | | | |
|---|---|---|---|
| 3,909,600 | 9/1975 | Hohn | 364/513 |
| 4,038,533 | 7/1977 | Dummermuth et al. | 364/474 |
| 4,187,454 | 2/1980 | Ito et al. | 318/568 |
| 4,263,538 | 4/1981 | Richiardi | 318/568 |

FOREIGN PATENT DOCUMENTS 1481134 7/1977 United Kingdom.
1561661 2/1980 United Kingdom.

*Primary Examiner*—Jerry Smith
*Attorney, Agent, or Firm*—Staas & Halsey

[57] ABSTRACT

A machine tool and robot control apparatus, for use in a system having a machine tool, a numerical control device for controlling the machine tool, an industrial robot and a robot control device for controlling the industrial robot, has the numerical control device and the robot control device connected to each other by means of a data transfer line. Each of the numerical control device and the robot control device is provided with a circuit for transmitting and receiving data which are exchanged through the data transfer line. The robot command data for controlling the robot, as well as the machining data for controlling the machine tool, are stored in a non-volatile memory device provided only in the numerical control device, through the data transfer line and respective circuits for transmitting and receiving data. The robot command data are successively read out from the non-volatile memory device and are transferred to the robot control device through respective data transmitting and receiving circuits and the data transfer line, thereby to control the robot.

7 Claims, 10 Drawing Figures

MACHINE TOOL AND ROBOT CONTROL APPARATUS

BACKGROUND OF THE INVENTION

This invention relates to an apparatus for controlling a machine tool and an industrial robot, and more particularly to a machine tool and industrial robot control apparatus which is highly suited for use in a system that includes a machine tool, a numerical control device for controlling the machine tool, an industrial robot, and a robot control device for controlling the industrial robot.

Many machine shops or factories employ systems that include a machine tool for machining a workpiece to prescribed specifications, and an industrial robot for executing various tasks such as the mounting of workpieces on the machine tool, the demounting of the workpieces from the machine tool, the exchanging of tools, and the cleaning of scraps produced by the machining operation. Ordinarily, such systems are provided with a numerical control device for controlling the machine tool, and with a separate control device for controlling the industrial robot. The numerical control device and the robot control device each incorporate a memory device, the memory device of the former storing a machining program which instructs the machine tool to machine the workpiece in a desired manner, and the memory device of the latter storing a robot command program which includes robot command data. In addition, both the numerical control device and the robot control device incorporate a processing unit. Each processing unit reads out sequentially the machining data and the robot command data from the corresponding memory device, and controls the machine tool or robot on the basis of the respective machining or robot control data so that the machine tool executes a prescribed machining operation and the robot a prescribed task in conformance with the particular command. The term "memory operation" is used in referring to the above system which comprises storing a machining program or robot command program in a memory device and then reading out sequentially the respective machining data or robot command data from the device.

In memory operation it is necessary to prevent the destruction or mutilation of the machining program and the robot command program in the event of an interruption in the power supply. To this end, each of the memory devices described above is composed of a high-capacity, non-volatile random access memory RAM (which shall be taken to include means in which a volatile RAM is backed up by a battery) such as a magnetic core or magnetic bubble memory. More specifically, in accordance with the prior art, a high-capacity, non-volatile memory is provided in both the numerical control device and the robot control device in the system described above. Moreover, in order to simplify the entering of data when an identical machining or robot operation is to be performed at some future date, a nonvolatile external storage medium such as a cassette-type magnetic tape, a cassette-type semiconductor memory, or a paper tape puncher is connected to each of the control devices so that the data stored in their respective memory devices can be preserved in the external storage media.

Thus it can be understood that the conventional system, including a numerically controlled machine tool and robot, is high in cost due to the requirement for two high-capacity, non-volatile memories and the corresponding two external storage units. The high price has inevitably impeded the wider use of robot systems.

SUMMARY OF THE INVENTION

It is, therefore, a major object of the invention to provide a less-expensive machine tool and robot control apparatus in which only one non-volatile, high-capacity memory and only one external storage unit are used commonly for both the numerical control device and the robot control device.

It is another object of the invention to provide a machine tool and robot control apparatus which is free from the problem of destruction or mutilation of the machining program and robot command program in the event of an interruption in the power supply.

It is still another object of the invention to provide a machine tool and robot control apparatus in which a numerical control device incorporates a non-volatile memory which stores a machining program and a robot command program, the machining instruction being read out in accordance with the progress of machining to control the machine tool, the robot command program being read out from the non-volatile memory in accordance with the progress of the task performed by the robot to control the robot.

Other features and advantages of the invention will be apparent from the following description taken in conjunction with the accompanying drawings.

BRIEF DESCRIPTION OF THE DRAWINGS

FIG. 9 is an illustration of a robot command program.

DESCRIPTION OF THE PREFERRED EMBODIMENTS

Figure 1:
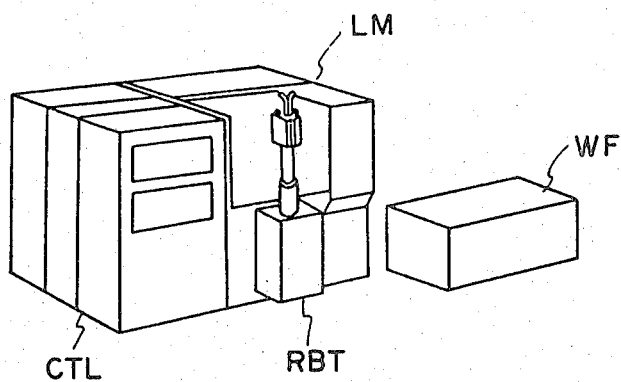
FIG. 1 is a schematic perspective view of a machine tool and robot control apparatus to which the invention is applied.

Referring first to FIG. 1 schematically showing a machine tool and robot control apparatus of the invention, a symbol LM represents a lathe as a machine tool, while a symbol RBT represents an industrial robot adapted to perform various tasks such as attaching and detaching of a workpiece to and from the lathe LM, changing of tools, cleaning of scraps and so forth. A controller locker CTL incorporates a numerical control device for controlling the lathe and a robot control device for controlling the industrial robot. A work feeder WF is adapted to feed unworked workpieces.

According to this arrangement, the numerical control device and a robot control device are mounted in a common locker and are adapted to be driven by a common power supply so as to lower the total cost of the system.

Figure 2A:
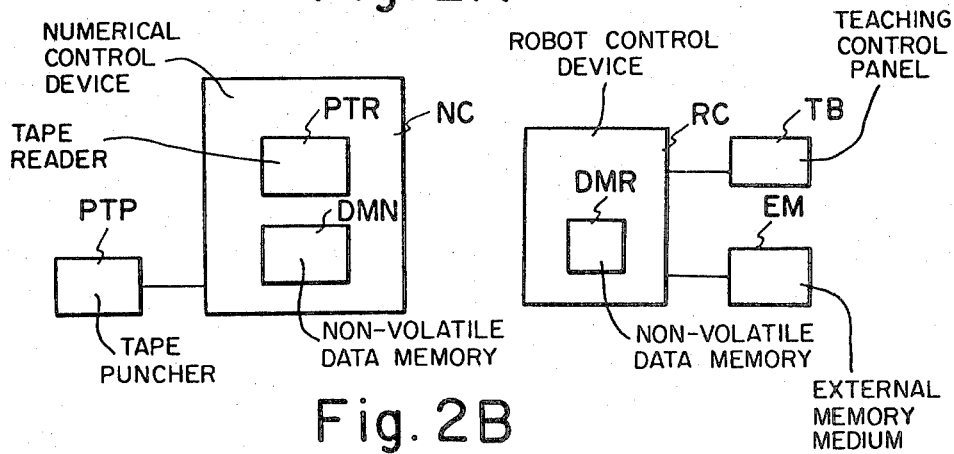
FIG. 2A is a schematic illustration of a conventional machine tool and robot control apparatus.
Figure 2B:
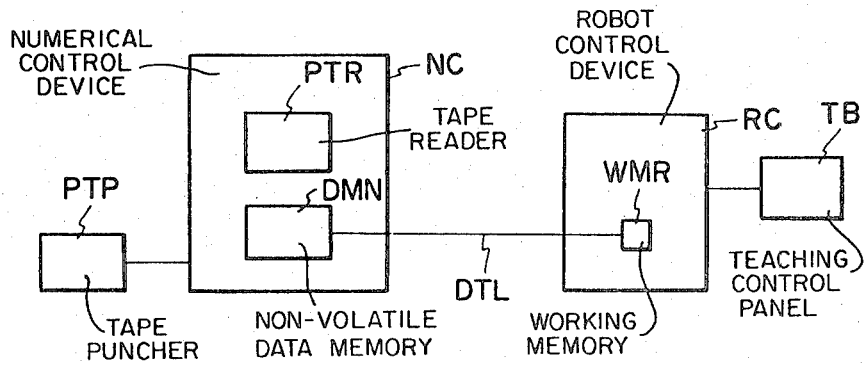
FIG. 2B is a schematic illustration of a machine tool and robot control apparatus of the invention.

Referring now to FIGS. 2A and 2B showing, respectively, a conventional machine tool and robot control apparatus of the prior art and that of the invention. Symbols NC, RC and DMN represent, respectively, a numerical control device, a robot control device and a non-volatile data memory. The non-volatile data memory DMN is incorporated in the numerical control device NC and stores various machining data for controlling the machine tool. A non-volatile data memory DMR (see FIG. 2A) incorporated in the robot control device RC stores robot command data for controlling the industrial robot. A paper tape reader PTR reads the numerical control information (machining data) in the form of perforations in a paper tape and plants the machining data in the data memory DMN. A paper tape puncher PTP punches the machining data memorized by the memory DMN in the paper tape as an external memory medium. A symbol TB represents a teaching control panel through which the robot command data are entered. A reference symbol EM represents an external memory medium in the form of a cassette type magnetic tape or a cassette type semiconductor memory. In FIG. 2B, a symbol DTL represents a data transfer line through which the data transfer between the numerical control device NC and the robot control device is made. The robot control device RC (see FIG. 2B) incorporates a working memory WMR which is constituted by a high-speed, volatile and small-capacity RAM (random access memory).

In the conventional system shown in FIG. 2A, the numerical control device NC and the robot control device RC each incorporate a high-capacity, non-volatile data memory DMN, DMR, and each is connected to its own external memory device (tape puncher PTP, cassette type magnetic tape EM). The processor (not shown) in each control device successively reads out the machining data or robot command data from the associated data memory DMN or DMR and performs the numerical control processing or the robot control processing. Also, in order to execute the same control processing at some future date, the machining data in the data memory DMN is punched and stored in the paper tape by means of the paper tape puncher PTP, while the robot command data in the data memory DMR is entered and stored in the cassette type magnetic tape EM.

By contrast, in the machine tool and robot control apparatus of the invention shown in FIG. 2B, the non-volatile, high-capacity data memory is installed only in the numerical control device NC, while the robot control device RC is provided only with a high-speed, volatile, low-capacity working memory WMR. As to the external memory medium, a paper tape puncher PTP is connected to the numerical control device NC, whereas the robot control device RC has no external memory medium connected thereto. Thus, in the apparatus of the invention, the robot command data taught by the teaching control panel TB is temporarily planted in the working memory WMR and is successively read out from the working memory to control the robot. The robot command data stored in the working memory WMR is transferred through the data transfer line DTL to the non-volatile data memory DMN where the data is planted. Also, in order to execute the same control processing at some future date, the machining data and the robot command data in the data memory DMN are punched and stored in the paper tape by means of the paper tape puncher PTP. Then the machining data and the robot command data are read out as required by the paper tape reader PTR and are planted in the data memory DMN at some future day.

Figure 3:
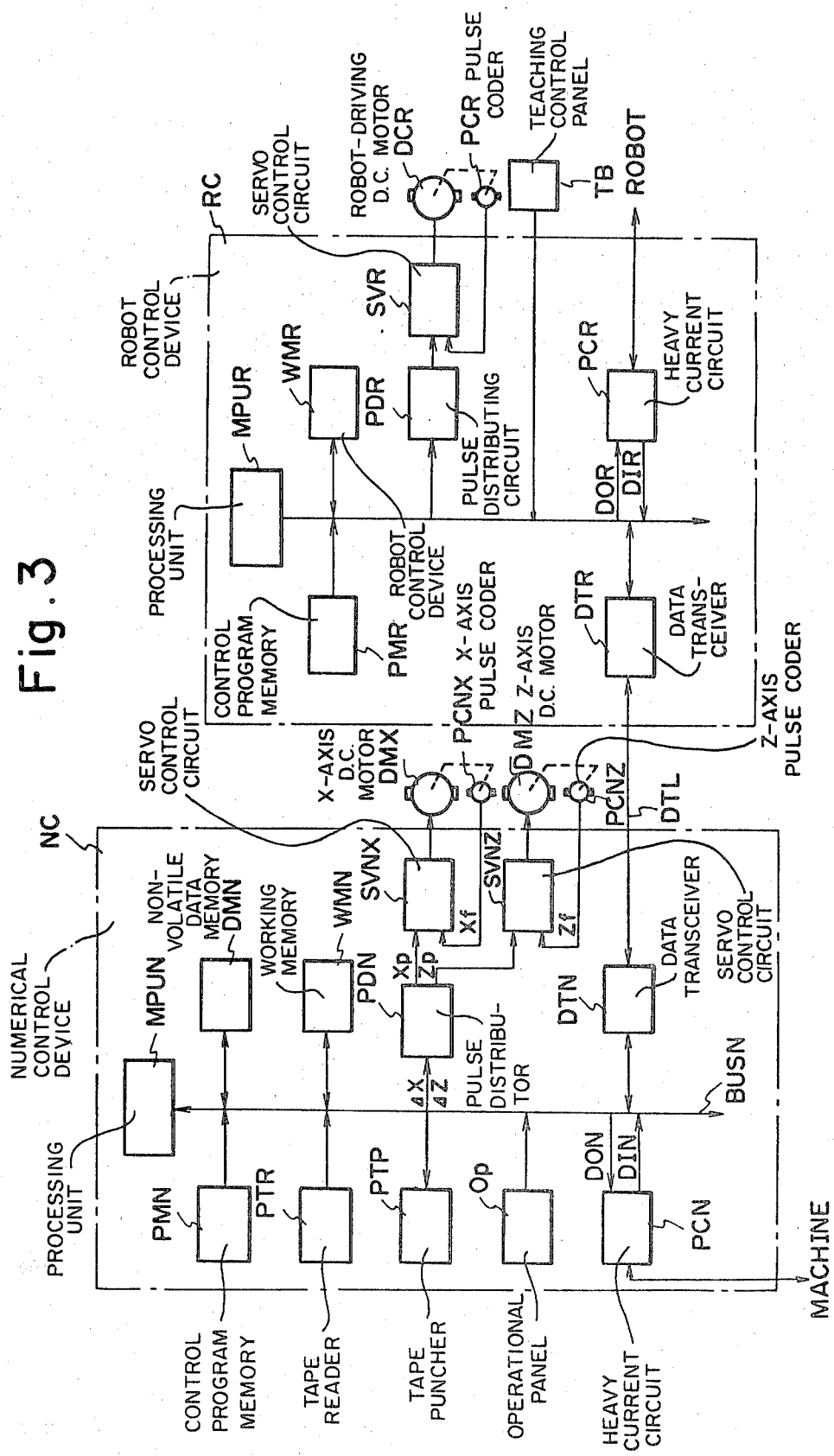
FIG. 3 is a block diagram of a machine tool and robot control apparatus of the invention.

FIG. 3 is a detailed block diagram of the apparatus of the invention, in which the same reference numerals are used to denote the same parts as those shown in FIG. 2B, a detailed description of these parts being omitted.

In this Figure, a symbol BUSN represents a BUS line which includes an address bus for transmitting address signals and a data bus for transmitting data. A working memory WMN is constituted by a high-speed, small-capacity RAM and is adapted to temporarily store the machining data read out from the non-volatile data memory DMN. A control program memory PMN memorizes a control program, while a processing unit MPUN, such as a microprocessor, executes various operations such as numerical control, editing, data transmission and receiving and so forth in accordance with the control program and the machining program. A symbol PDN represents a pulse distributor which, upon receipt of position commands X, Z, conducts a known pulse distribution operation to distribute pulses Xp and Zp. Symbols SVNX and SVNZ represent servo control circuits which produce analog voltages proportional to the absolute values $|Xp-Xf|$ and $|Zp-Zf|$, upon receipt of the distributed pulses Xp, Zp and feedback pulses Xf and Zf which are produced each time the motor rotates by a predetermined amount. The driving in the directions of the X and Z axes are performed by D.C. motors DMX and DMZ, respectively. Pulse coders PCNX and PCNZ are fixed to the shafts of the D.C. motors DMX and DMZ and produce the aforementioned feedback pulses Xf and Zf as these motor shafts are rotated through predetermined angles. The servo circuits, SVNX, SVNZ, D.C. motors DMX, DMZ and the pulse coders PCNX and PCNZ in combination constitute a servo unit which makes both of the absolute values $|Xp-Xf|$ and $|Zp-Zf|$ zero through servo control.

An operation panel is represented by OP. A data transceiver DTN is adapted for the transmission and receiving of data between itself and the robot control device RC, under the control of the processing unit MPUN, and incorporates such elements as a buffer register as will be seen from FIG. 4.

Figure 4:
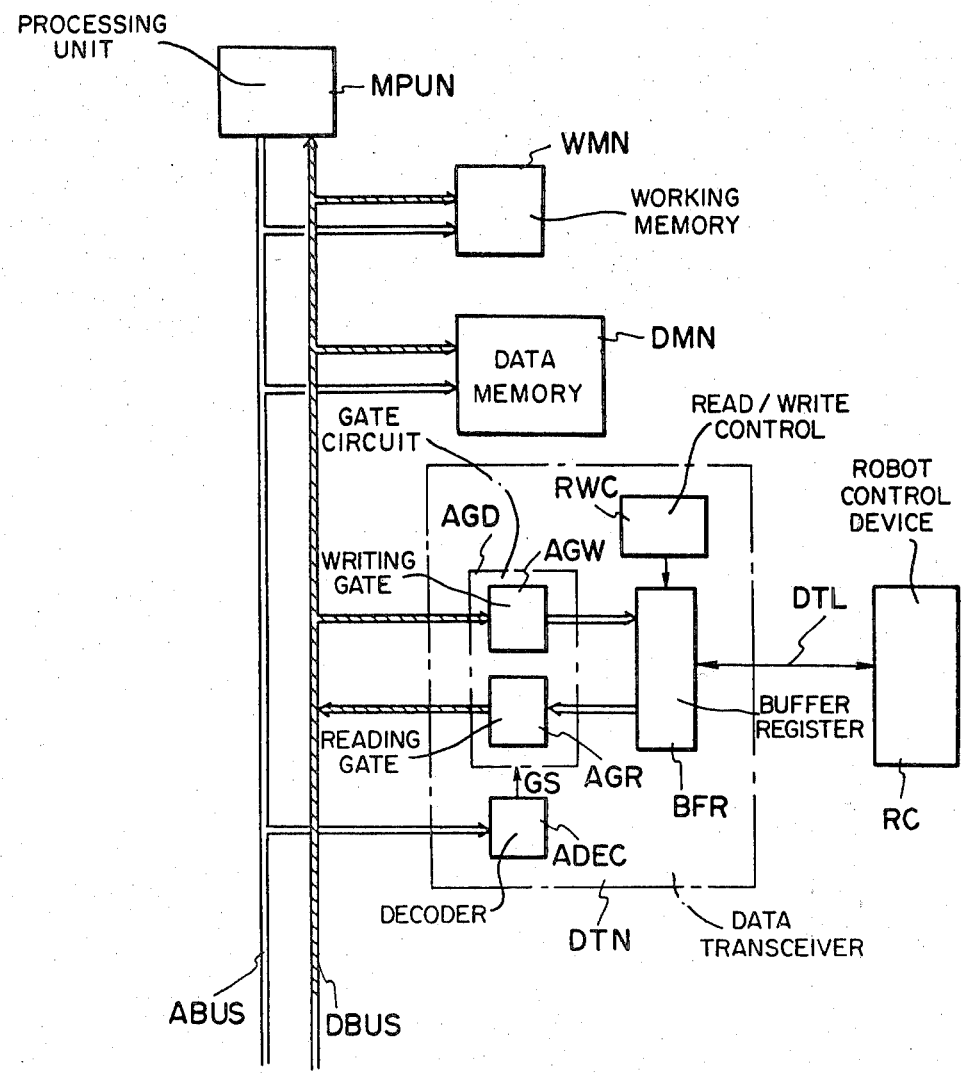
FIG. 4 is a block diagram of a data transceiver.

FIG. 4 shows the block diagram of the data transceiver DTN in connection with the processing unit MPUN. In this Figure, ADEC represents a decoder which decodes the address signal transferred from the processing unit MPUN through the address bus ABUS. The decoder opens the writing or reading AND gate of a later-mentioned gate circuit, if the transferred address signal conforms to the address allotted to the data transceiver DTN. A symbol AGD represents a gate circuit having a plurality of writing gates AGW and a plurality of reading gates AGR. The gate circuit AGD opens the writing gate AGW or reading gate AGR, in accordance with a gate signal GS coming from the decode circuit ADEC, so as to write the data coming through the data bus DBUS from the processing unit MPUN in a later-mentioned buffer register or to read and deliver the data stored in the buffer register to the data bus DBUS. A symbol BFR represents a buffer register capable of performing parallel writing and parallel reading of data, as well as series writing and reading bit by bit. A symbol RWC represents a read/write control circuit adapted to control the writing or reading of parallel or series data into and out of the buffer register BFR. A symbol DTL represents a data transfer line. The processing unit MPUN delivers the robot command data stored in the data memory DMN to the robot control device RC in a manner described hereinunder.

Firstly, 1-byte robot command data to be delivered is read out from the data memory DMN and is prepared in the working memory WMN. Subsequently, the address signal of the writing gate AGW is delivered to the address bus ABUS and, at the same time, the 1-byte robot command data prepared in the working memory WMN is transmitted to the data bus DBUS. The address signal is decoded by the decoder ADEC which acts to open the writing gate AGW in accordance with the result of the decoding through the gate signal GS. In consequence, the robot command data delivered to the data bus DBUS is written in parallel form in the buffer register BFR, under the control of the read/write control circuit RWC. As the robot command data is stored in the buffer register BFR, the read/write control circuit RWC acts to read the 1-byte robot command data bit by bit and deliver the same to the robot control device RC in a bit serial manner through the data transfer line DTL. This process is repeated to successively transfer the robot command data to the robot control device RC.

The robot command data delivered by the robot control device RC is stored in the data memory DMN in a manner explained hereinunder. Namely, the robot command data, which is delivered by the robot control device RC in a bit-serial manner bit by bit is written in series in the buffer register BFR by the controlling operation of the read/write control circuit RWC. On the other hand, the processing unit MPUN periodically produces the address of the reading gate AGR, so that the reading gate is opened when the decoder ADEC decodes the address. In consequence, the 1 byte robot command data stored in the buffer register BFR is delivered to the data bus DBUS and is temporarily stored in the working memory WMN. Then, the robot command data is written in the date memory DMN by the control of the processing unit MPUN. This operation is repeated to successively store the robot command data in the data memory DMN.

Returning to FIG. 3, a heavy current circuit PCN performs the exchange of the signal between the machine tool and the control apparatus. Namely, the heavy current circuit PCN delivers signals DON such as an auxiliary function (M function) command, spindle rotation command (S function) and the like in the form of contact signals and, as the machine tool completes the tasks corresponding to the auxiliary function command and the spindle rotation command, the heavy current circuit PCN delivers the completion signals DIN in the form of contact signals to the bus line BUSN.

Figure 5:
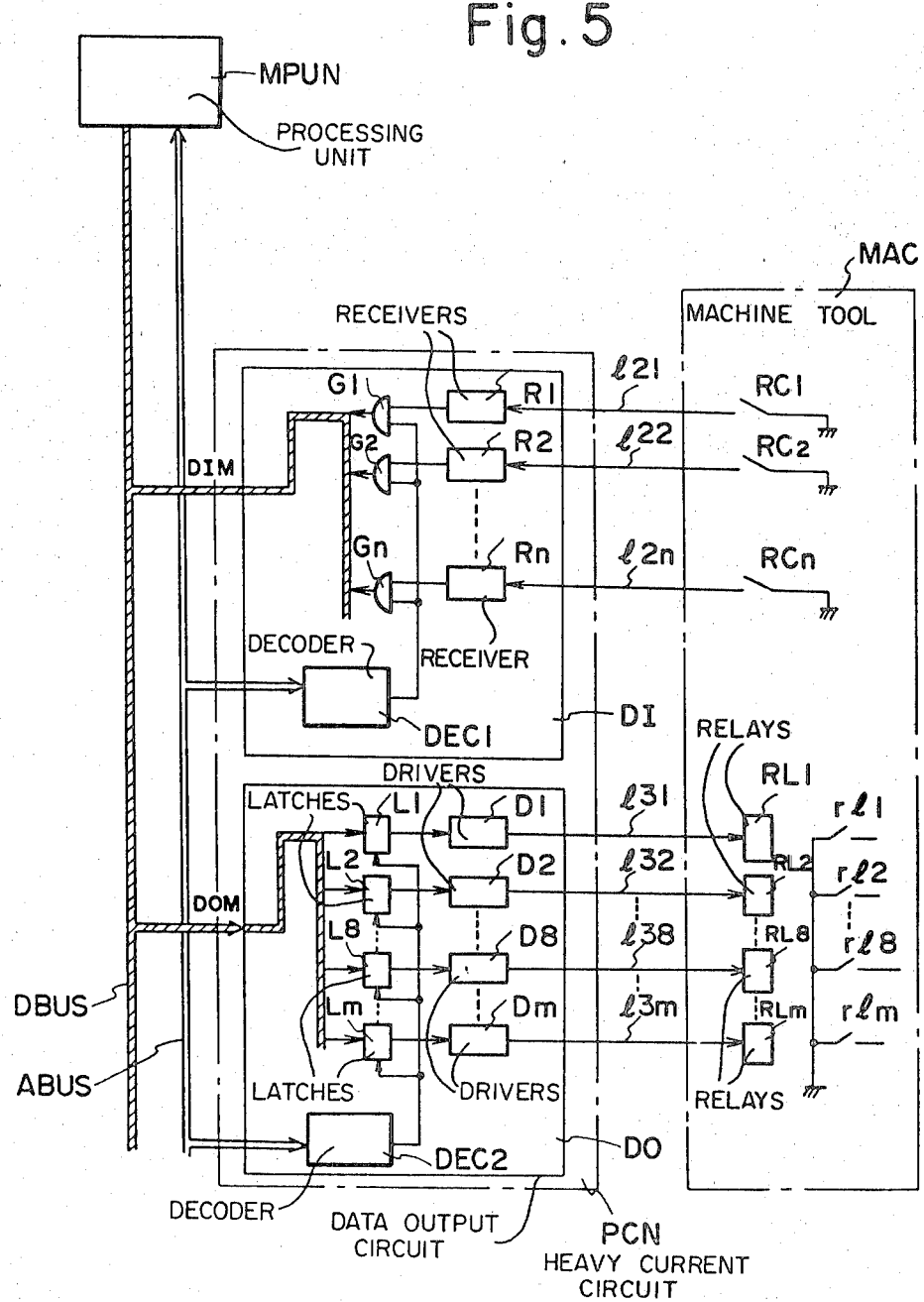
FIG. 5 is a block diagram for explaining the exchange of data between a machine tool and a numerical control device.

FIG. 5 is a block diagram for explaining the exchange of signals between the machine tool MAC and the numerical control device NC.

A data input circuit DI includes receivers $R_1$ through $R_n$ which receive signals from various limit switches and relay contacts and the like, the signals being obtained from the machine tool MAC side, AND gates $G_1$ through $G_n$, and a decoder $DEC_1$ which decodes address signals and opens the AND gates.

A data output circuit DO includes a number of latch circuits $L_1$ through $L_m$ for storing a two-digit (eight bit) M function command in the form of binary decimal notation (BCD), a two-digit S function command in the form of BCD, and a two-digit T function command in the form of BCD, drivers $D_1$ through $D_m$ for corresponding ones of the latch circuits $L_1$ through $L_m$, the drivers being adapted to send the latch circuit output signals to the machine tool, and a decoder $DEC_2$ which allows prescribed latch circuits to be set or reset upon decoding the address signals.

Cables $l_{21}$ through $l_{2n}$, and $l_{31}$ through $l_{3m}$ provide a connection between the numerical control device NC (via the circuit PCN) and the machine tool MAC to enable the exchange of data. Relay contacts $RC_1$ through $RC_n$ open and close in accordance with the on/off operation of limit switches such as overtravel limit switches and speed reduction limit switches for the $\pm X$ and $\pm Z$ directions, and permit the generated signals to be delivered to the receivers $R_1$ through $R_n$ over the cables $l_{21}$ through $l_{2n}$. Relays $RL_1$ through $RL_m$ operate in accordance with the outputs of drivers $D_1$ through $D_m$ and open or close relay contacts $rl_1$ through $rl_m$ to control the machine tool MAC, particularly such items as spindle rotation, spindle speed and tool exchange.

If the command data read out from the data memory DMN (FIG. 3) is position command data (feed speed F, position information $\Delta X$, $\Delta Z$), this F, $\Delta X$, and $\Delta Z$ data will enter the pulse distributing circuit PDN (FIG. 3) which will execute a well-known pulse distributing operation and deliver output pulses $X_p$, $Z_p$ to machine tool servo control circuits SVNX, SVNZ. The pulses will drive the DC motors DMX, DMZ, whereby the movement of such machne tool members as a cutter and table will be controlled as specified by the command. On the other hand, if the command data read out of the data memory DMN is, for example, a miscellaneous function command "M03" (whether a spindle function command or tool function command), the processor MPUN sends an address signal AD(m), which conforms to the M function command, out on the address bus ABUS, and sends data "03" (0000 0011) out on the data bus DBUS. The address signal AD(m), after being decoded by the decoder $DEC_2$, places only the eight latches $L_1$ through $L_8$ in a state that allows them to be set or reset, these latches being those which are to store the two-digit (eight bit) M function command. Accordingly, the data "03" (0000 0011) on the data bus DBUS sets the latches $L_1$, $L_2$ and resets the latches $L_3$ through $L_8$, and is delivered to the machine tool MAC through the cables $l_{31}$ through $l_{38}$ to open or close the relay $RL_1$ through $RL_8$. Thus, if the command "M03" is a miscellaneous function command for governing the flow of a coolant, the arrival of the command will cause a coolant to flow in the machine tool MAC.

The reading in of the signals from relay contacts $RC_1$ through $RC_n$ from the machine tool MAC for transmission to the numerical control device NC proceeds as follows. Addresses AD ($\gamma C_1$), AD ($\gamma C_2$) ... AD ($\gamma C_n$) corresponding to the relay contact signals from $RC_1$, $RC_2$ ... $RC_n$ are stored successively in address storage areas of a data memory DMN. The processor MPUN, utilizing the idle time of each bus, reads out the successive addresses AD ($\gamma C_1$), AD ($\gamma C_2$) ... AD ($\gamma C_n$), and sends these addresses out on the address bus ABUS, this being carried out by starting the operation of the numerical control device NC. These addresses are decoded by the decoder $DEC_1$. Accordingly, if the address AD ($\gamma C_1$) appears on the address bus ABUS, the decoder $DEC_1$ responds by opening only the AND gate $G_1$, so that the relay contact signal from $RC_1$ enters the data bus DBUS through the cable $l_{21}$, receiver $R_1$ and AND gate $G_1$ and is applied to the processor MPUN which performs a processing operation in accordance with the contact signal. Thereafter the other relay contact signals from $RC_2$, $RC_3$ . . . $RC_n$ are similarly applied to the processor MPUN. If the read-in signal from $RC_n$ has been completed, the operation is such that the relay contact signals from $RC_1$, $RC_2$ . . . are read in again. Though the contact signals have been read in one at a time in accordance with the foregoing operation, it is obvious that a plurality of these signals can be read in at one time by arranging it so that a plurality of AND gates open for a single address.

Returning to FIG. 3, a control program memory PMR stores the control program for controlling the robot, while a processing unit MPUR, which may be a micro-processor, executes various operations such as control of the robot, transmission and receiving of data and so forth in accordance with the robot command data and the control program. A pulse distributing circuit PDR, servo control circuit SVR, D.C. motor DCR for driving the robot arm and a pulse coder PCR correspond, respectively, to the aforementioned pulse distributing circuit PDN, servo circuits SVNX, SVNZ, D.C. motors DMX, DMZ and the pulse codes PCNX, PCNZ and constitute in, in combination, a servo unit which performs such servor control as to make the difference between the number of the distributed pulses and the number of the feedback pulses zero.

A symbol DTR represents a data transceiver having an identical construction to the data transceiver DTN incorporated in the numerical control device NC, and is connected to the data transceiver DTN through the data transfer line DTL to exchange the data therebetween. A teaching control panel TB provides instructions concerning the robot operation and plants the robot command data in the working memory WMR.

Figure 6:
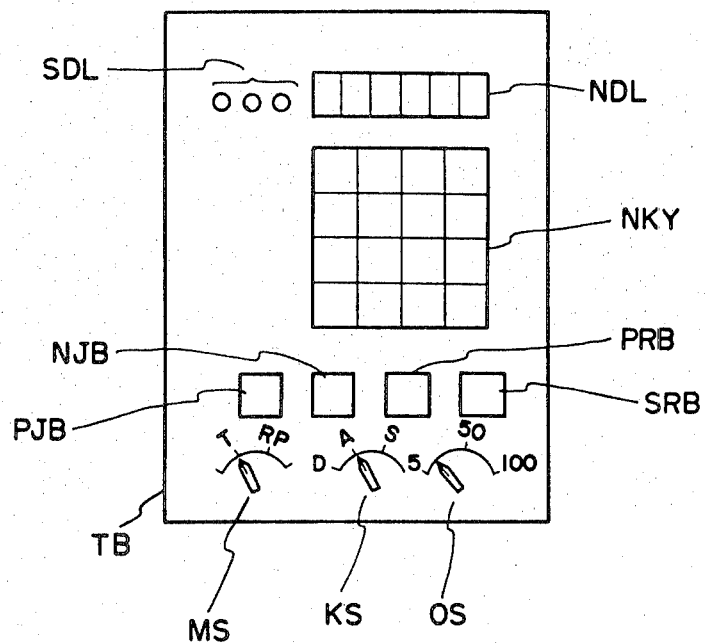
FIG. 6 is a front elevational view of a teaching control panel.

FIG. 6 illustrates the arrangement of various switches on the above-mentioned teaching control panel TB.

The teaching control panel TB, as illustrated in FIG. 6, includes a mode selection switch MS for selecting from among such modes as a teach mode "T" and a repeat operation mode "RP", a data classification selection switch KS for designating whether a numerical value entered from the teaching control panel is data "D", an address "A", or a task code "S", an over-ride switch OS for over-riding jog feed speed or feed speed when the rotor is operating automatically, a jog button PJB which permits the robot arm to be fed manually in the direction of the positive Z-axis, a jog button NJB which permits the robot arm to be fed manually in the direction of the negative Z-axis, a position record button PRB employed at the time of a teaching operation to store data in a data memory DMN, such data being the present position of the robot arm, as stored in a present position register which is incorporated in the working memory WMR, a task code record button SRB for storing a task code in the data memory DMN of the numerical control device NC, numeric keys NKY for entering the numerical values such as addresses and the like, condition indicator lamps SDL for indicating an alarm or the like, and teaching indicator lamps NDL of six digits in decimal notation for displaying a sequence number, a task code, an address or the like. The teaching of robot command data through use of the teaching control panel TB is carried out through a sequence which will now be described in brief.

First, the data classification selection switch KS is set to the position "A" (address selection), after which the numeric keys MKY are operated to enter the address which designates the areas of the data memory DMN, into which the teaching content is to be written, the data memory DMN being incorporated in the numerical control device NC. The address thus is stored in the address register of the working memory WMR, also incorporated in the robot control device RC, and is simultaneously displayed by the first four digits of the numerical display lamps NDL. If the data classification selection switch KS is then set to the position "D" (data selection) and the sequence number and operating speed are set, these will likewise be stored in a speed register located in the working memory WMR, and will be displayed by the numerical display lamps NDL. Depressing the job button PJB or NJB under such conditions will permit the robot arm to be fed to a desired position. In doing so pulses issued by a pulse distributing circuit PDR shift the content of the present position register, located in the working memory WMR, by either $+1$ or $-1$ in accordance with the direction of arm movement. Accordingly, the present position of the arm is stored in the present position register at all times. If the position record button PRB is depressed after the arm has been moved as described above, then the address, the desired position, the feed speed and the sequence number which have been stored in the address register, the present position register, the speed register and the like, are sent to the data transceiver DTR, and thereafter to the numerical control device NC through the data transmission line DTL. This data is then stored in the prescribed region of the data memory DMN designated by the address. This completes the teaching sequence for commanding movement of the arm.

Figure 7:
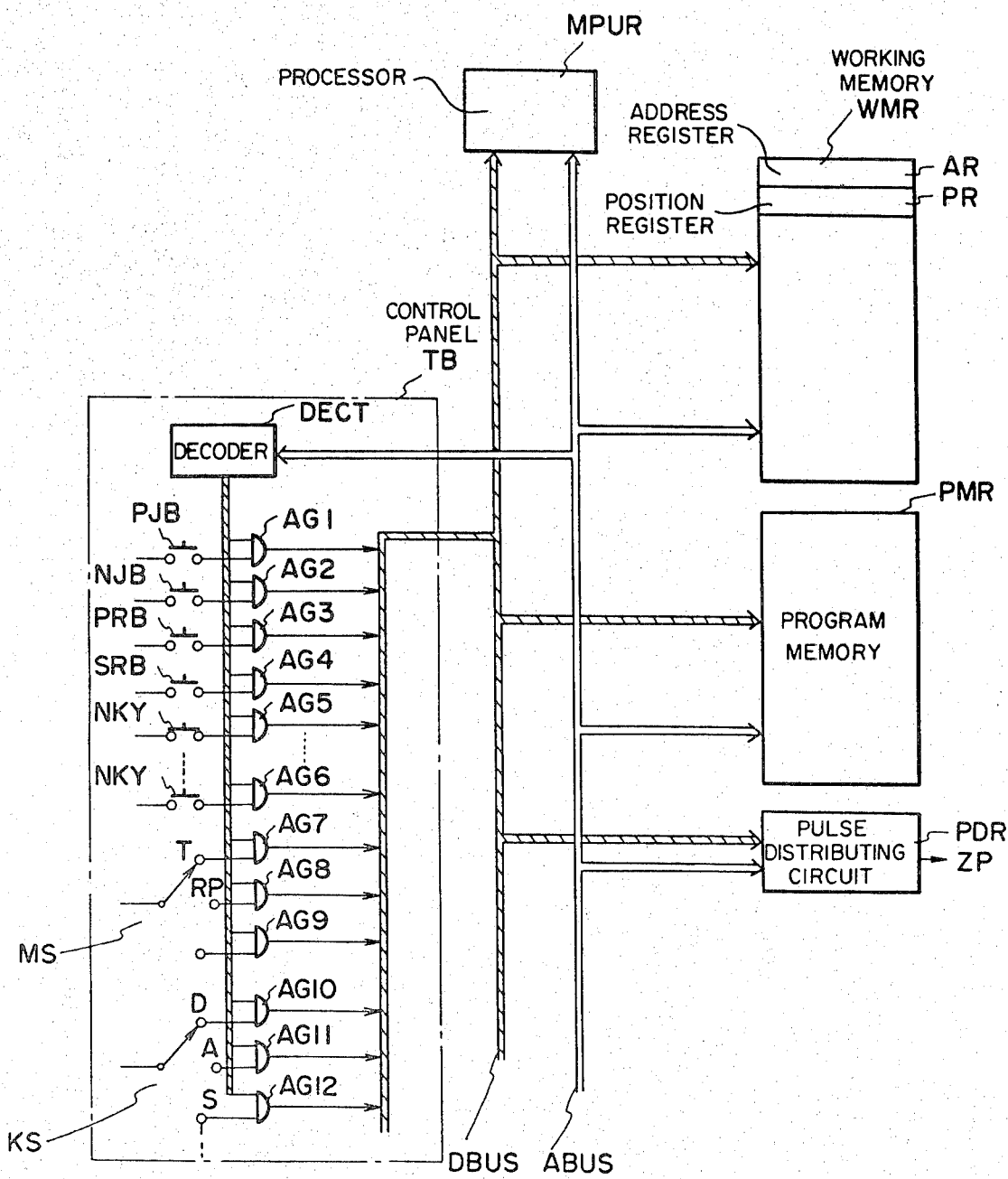
FIG. 7 is an illustration of the exchange of data between the teaching control panel and a robot control device.

If the data classification selection switch KS is now set to the "S" position (task code selection), and if the prescribed operations to be carried out by the hand at the desired position and by the machine tool are entered by inputting the robot task code, then depressing the task code record button SRB will plant the task code in the prescribed area of the data memory DMN of the numerical control device NC, as designated by the address. This completes the teaching of one set of data for robot command. Repeating the above sequence allows a series of robot command data to be stored in the data memory DMN so that a full set of robot command data can be taught. The exchange of data between the teaching control panel TB and the robot control device RC will now be described in conjunction with FIG. 7, in which like or corresponding component parts bear the same reference numerals as those used in FIGS. 2 and 3. The teaching control panel TB includes a decoder DECT and AND gates $AG_i$ ($i=1, 2 \ldots$) The decoder DECT decodes addresses delivered by the processor MPUR over the address bus ABUS and opens prescribed ones of the AND gates $AG_i$. As a result, the AND gates permit the data bus DBUS to receive logic signals "1", "0" which indicate the status of, for example, the jog buttons PJB, NJB, position record button PRB, task code record button SRB and the numeric keys NKY, and the status of the mode selection switch MS and data classification selection switch KS, etc.

More specifically, the processor MPUR is adapted to successively generate, repeatedly and at high speed, addresses for the push-buttons PJB through NKY and for the selection switches MS, KS, OS, whereby the status of the push-buttons, namely whether the push-buttons have been depressed or not, and the status of the selection switches, namely the positions to which the selection switches have switched are read. A prescribed teaching control operation is executed on the basis of the status of the foregoing switches.

Accordingly, when the teaching robot command data, mode switch MS is employed to select the teach mode "T", this operation is immediately recognized by the processor MPUR. If the address "A" position is how selected by the data classification selection switch KS and the address is entered via the numeric keys NKY, the address data is stored in the address register AR of the working memory WMR. If the jog button PJB is depressed, the processor detects this fact in the manner described above, so that the pulse distributing circuit PDR issues the pulse ZP. The pulse ZP causes the arm of robot to move. It should be noted that the content of the Z-axis present position register PR, located in working memory WMR, is shifted to the left or right each time the pulse ZP is generated, the direction of the shift depending upon the direction of robot arm movement. If the arm has arrived at the prescribed position and the job button PJB is then released, this fact is immediately read by the processor MPUR which responds by instructing the pulse distributing circuit PDR to cease the pulse distributing operation. If the position record button PRB is then depressed, the content of the present position register PR, namely the present position of the robot arm, is planted, through the data transceiver DTR (FIG. 3), into the storage region of the data memory DMN as designated by the address stored in the address register AR. This completes the robot teaching operation with regard to the arm movement.

Returning to FIG. 3, a heavy current circuit PCR delivers various signals DOR coming from the processing unit MPUR such as a robot axis control signal, robot hand open/close signal and so forth, to the robot in the form of contact signals, and delivers signals DIR coming from the limit switches which detect completion of robot axis control, robot hand control and so forth back to the processing unit MPUR.

Figure 8:
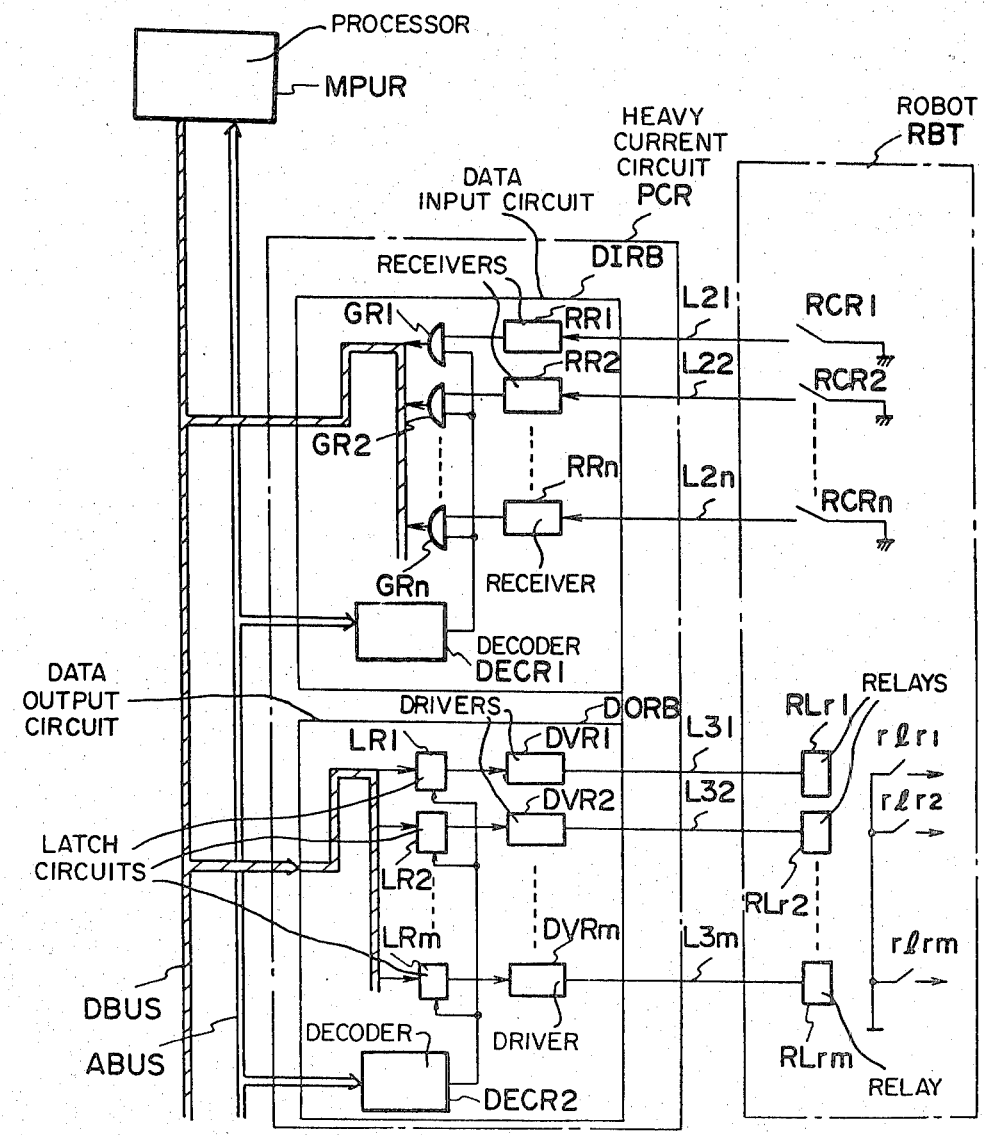
FIG. 8 is an illustration for explaining the exchange of data between a robot and the robot control device.

Next, the exchange of data between the robot RBT and the robot control device RC will be described with reference to FIG. 8. Again, the working memory WMR, and control program memory PMR, etc., have been omitted and like or corresponding component parts bear the same reference numerals as those used in FIG. 3.

The heavy current circuit PCR for administering the exchange of data between the robot RBT and the robot control device RC is almost identical in construction to the heavy current circuit PCN of FIG. 5, and is composed of a data input circuit DIRB and a data output circuit DORB. The data input circuit DIRB includes receivers $RR_1$ through $RR_n$ adapted to receive on/off signals through limit switches or the like located on the robot, which on/off signals indicate the completion of certain robot operations, such as arm or hand operation, AND gates $GR_1$ through $GR_n$, and a decoder $DECR_1$ which decodes address signals and opens the AND gates.

The data output circuit DORB includes latch circuits $LR_1$ through $LR_m$ for storing digital output signals such as robot task codes, drivers $DVR_1$ through $DVR_m$ for corresponding ones of the latch circuits $LR_1$ through $LR_m$, the drivers being adapted to send the latch circuit output signals to the robot, and a decoder $DECR_2$ which allows prescribed latch circuits to be set or reset upon decoding the address signals.

Cables $L_{21}$ through $L_{2n}$, and $L_{31}$ through $L_{3m}$ provide a connection between the heavy current circuit PCR and the robot RBT. $RCR_1$ through $RCR_n$ denote relay contacts or the like which open and close in accordance with the operation of various limit switches that are not shown, and which permit signals to be delivered to the receivers $RR_1$ through $RR_n$ over the cables $L_{21}$ through $L_{2n}$. Relays $RL_{r1}$ through $RL_{rm}$ operate in accordance with the outputs of drivers $DVR_1$ through $DVR_m$ and open or close relay contacts $rl_{r1}$ through $rl_{rm}$ to control the robot RBT, such as the opening and closing of the robot hand.

The heavy current circuit PCR handles the exchange of data in exactly the same manner as the heavy current circuit PCN inserted between the numerical control device NC and the machine tool MAC.

The machine tool and robot control apparatus of the invention having the described construction operates in a manner explained hereinunder.

The machining program punched in the paper tape is read by the tape reader PTR and stored in the non-volatile data memory DMN. On the other hand, the robot command data taught by the teaching control panel TB in the described procedure is stored in the working memory WMR and is successively prepared in the buffer register of the data transceiver DTR. This data is transferred to the data transceiver DTN through the data transfer line DTL. Thereafter, the robot command data is delivered by the processing unit MPUN from the data transceiver DTN to the data memory DMN in the numerical control device NC and is stored in the data memory DMN. After the storage of the machining program and the robot command program in the data memory DMN, the processing unit MPUN successively reads out and delivers the machining data to the high-speed, small-capacity working memory WMN in accordance with the progress of the processing and following the automatic operation instruction given by the operation panel OP, thereby to execute numerical control in accordance with these machining data. The processing unit MPUN prepares the robot command data successively in the buffer register BFR (See FIG. 4) of the data transceiver DTN.

Meanwhile, the processing unit MPUR in the robot control device RC writes the robot command data prepared in the data transceiver DTN into the high-speed, small-capacity working memory WMR, through the data transfer line DTL and the data transceiver DTR, in accordance with the progress of the tasks performed by the robot. If the working memories WMN and WMR have sufficiently large capacities, it is possible to store the entire parts of the machining program and the robot command program in these memories at one time. Such an arrangement, however, is not preferred because it incurs a rise in cost.

The machining data and the robot command data, which are stored in the non-volatile memory DMN, are never destroyed even if the electric power supply is cut off after the completion of work. Although the robot command program is stored in the data memory DMN in the numerical control device, it is not necessary to increase the capacity of the data memory DMN for the accomodation of such a program, because the storage can be made by making an efficient use of the vacant region of the data memory DMN where no machining data is stored.

To restart the same machining and robot operations after a suspension of the electric power supply, the power supply is turned on again and the switches on the operation panel OP are turned to the automatic operation mode. By so doing, the machining data and the robot command data are successively read out from the data memory DMN to execute the numerical control operation and the robot task operation in the same manner as explained before.

The machining program and the robot command program stored by the data memory DMN can be punched in the paper tape by means of the paper tape puncher PTP so as to be recorded and preserved. To carry out the same machining and the robot operations at some future date, the programs preserved in the paper tape are read by the paper tape reader PTR and stored in the data memory DMN. In this connection, however, it is to be noted that the robot command program be made following the format of the machining program, because both the paper tape reader PTR and the paper tape puncher PTP are made to conform to the format of the machining program of the numerical control device, e.g. a format following the RS 244-A of the EIA standard.

Referring now to FIG. 9 showing an example of the robot command program, 09900 represents the program number (program identification). The robot command program and the machining program carry program numbers at the beginning for identification purpose. Therefore, in the event that more than two machining programs and/or robot command programs are stored in the data memory DMN, it is necessary to read out the desired program by appointing the program number, before turning to the numerical control processing and the robot task processing. The program number of the robot command program is entered from the teaching control panel TB, and the data of the robot command program having the appointed number is successively read out from the data memory DMN into the working memory WMR of the robot control device RC. N001 through N005 are sequence numbers, while G represents a code which gives an instruction concerning numerical control device preparation function command, i.e., G-coded number are used for commanding various numerical control device preparation functions. Each robot command data program, however necessarily bears the control data G10*. Thus, the numerical control device considers, when G10 is read, that the present program including G10 is a robot command program. The numerical control device produces an alarm and stops the processing without delay when it happens to detect this signal G10 while it is performing the preparation numerical control processing. Therefore, malfunction of the numerical control device is avoided even when a program number of the robot command data is appointed incorrectly to a machine command program. On the other hand, the robot control device considers G10 as only a sign that the present program is a robot command program and continues subsequent processing in accordance with the subsequent data without being disturbed by G10.

In addition to the foregoing, it is also possible to place the control data at the beginning of the data of the program. A code S28 represents an S function command which appoints the rotational speed of the spindle in the format of the machining program. The robot control device RC regards this code S as being a robot task code and gives instructions for various tasks such as attaching and detaching of workpiece, cleaning of scraps, replacement of tool and so forth in accordance with the numerals following the code S. The codes Z3500 and X27000 represent the displacements in the direction of Z and X axes in the machining program but are taken in the robot command program as representing the displacement of a predetermined axis of the robot.

As will be seen from the foregoing description, the robot command program employs the same letters as those used in the machining program and, in addition, the format in the robot command program is identical to that of the machining program, although the meaning of the letters is different. Therefore, the numerical control device can perform editing and input/output processing of the robot command program in the same way as the processing for the machining program. It is possible to use a cassette type semiconductor memory or the like in place of the paper tape as the external memory medium.

From the foregoing description, it will be seen that the present invention remarkably reduces the cost of the system as a whole because the system can operate with only one non-volatile memory incorporated in the numerical control device and only one external memory medium.

In addition, since each program carries its own name for identification, it is possible to easily read out the desired program by appointing the program name.

Furthermore, by making the machining program and the robot command program incorporate control data which indicate that these programs are for machining and for robot command, respectively, it is possible to prevent the robot control operation from being conducted in accordance with the machining program and the numerical control processing from being conducted in accordance with the robot command program.

What we claim is:

1. A machine tool and robot control apparatus for use in a system having a machine tool, a numerical control device for controlling said machine tool, an industrial robot and a robot control device for controlling said industrial robot, said machine tool and robot control apparatus comprising: a data transfer line connected between said numerical control device and said robot control device; a data transceiver incorporated in said numerical control device and in said robot control device; a volatile memory device incorporated in said robot control device for storing robot command data; a non-volatile memory device incorporated in said numerical control device for storing both machine command data and robot command data; and means for transferring said robot command data from said volatile memory device of said robot control device to said non-volatile memory device of said numerical control device through said data transfer line and respective data transceivers so as to store said data in said non-volatile memory device.

2. A machine tool and robot control apparatus as claimed in claim 1, further comprising means for transferring said robot command data stored in said non-volatile memory device of said numerical control device to said volatile memory device of said robot control device through said data transfer line and respective data transceivers to control said robot in accordance with said robot command data.

3. A machine tool and robot control apparatus as claimed in claim 2, wherein a machining program containing said machine command data for controlling said machine tool and a robot command program containing said robot command data for controlling said robot have their own names for identification, so that the robot command program having its own identification name is transferred from said non-volatile memory device in said numerical control device to said memory device in said robot control device as the desired program identification name is entered in said numerical control device.

4. A machine tool and robot control apparatus as claimed in claim 3, wherein the machining program for controlling said machine tool and the robot command program for controlling said industrial robot are formed in the same format, at least one of said programs carrying control data ahead of the program data, said control data representing whether the data are for machining or robot command, and wherein said apparatus further comprises means for determining which one of the numerical control operation and the robot control operation is to be conducted in accordance with said control data.

5. A machine tool and robot control apparatus as claimed in claim 2 or 3, wherein said numerical control device further comprises:
   (a) a volatile working memory device for temporarily storing machine command data and robot command data;
   (b) a bus line including an address bus for transmitting address signals and a data bus for transmitting data; and
   (c) a processing unit operatively connected to said working memory device and non-volatile memory device for performing numerical control and editing, and for controlling data transmission and receiving of robot command data through said data transceiver of said numerical control device; and wherein said data transceiver of said numerical control device is connected to said working memory device, non-volatile memory device, and said processing unit through said address bus and said data bus and further comprises:
   (a) a buffer register for performing parallel writing and reading of data and series writing and reading bit-by-bit and connected to said data transfer line for transmitting and receiving data to and from said data transceiver of said robot control device;
   (b) a read/write control circuit connected to said buffer register for controlling the writing or reading of parallel or series data into and out of said buffer register;
   (c) a decoder circuit for decoding an address signal received from said processing unit through said address bus; and
   (d) a gate circuit operatively connected between said data bus and said buffer register and including a plurality of writing gates and a plurality of reading gates wherein the writing and reading gates are opened in accordance with a gate signal from said decoder circuit for transmitting data between said buffer register and said data bus.

6. A machine tool and robot control apparatus as claimed in claim 5, wherein said robot control device further comprises:
   (a) a teaching control panel for providing instructions relating to the operation of said robot and for inputting said robot command data into said robot volatile memory device;
   (b) a bus line including an address bus for transmitting address signals and a data bus for transmitting data; and
   (c) a processing unit responsive to the instructional input of said teaching control panel and operatively connected to said teaching control panel and said robot volatile memory device for controlling data transmission and receiving of robot command data through said data transceiver of said robot control device;
   and wherein said data transceiver of said robot control device is connected to said robot volatile memory, said teaching control panel and said processing unit through said address bus and said data bus and further comprises:
   (a) a buffer register for performing parallel writing and reading of data and series writing and reading bit-by-bit and connected to said data transfer line for transmitting and receiving data to and from said data transceiver of said numerical control device;
   (b) a read/write control circuit connected to said buffer register for controlling the writing or reading of parallel or series data into and out of said buffer register;
   (c) a decoder circuit for decoding an address signal received from said processing unit through said address bus; and
   (d) a gate circuit operatively connected between said data bus and said buffer register and including a plurality of writing gates and a plurality of reading gates, wherein the writing and reading gates are opened in accordance with a gate signal from said decoder circuit for transmitting data between said buffer register and said data bus.

7. A machine tool and robot control apparatus as claimed in claim 1, wherein a machining program containing said machine command data for controlling said machine tool and a robot command program containing said robot command data for controlling said industrial robot are formed in the same format, and wherein said apparatus further comprises a paper tape puncher incorporated in said numerical control device and adapted to punch into a paper tape the robot command program stored in said non-volatile memory device; and a paper tape reader incorporated in said numerical control device and adapted to read out said robot command data punched in said paper tape and to store the read-out in said non-volatile memory device.

* * * * *

UNITED STATES PATENT AND TRADEMARK OFFICE
CERTIFICATE OF CORRECTION

PATENT NO. : 4,396,987

DATED : Aug. 2, 1983

INVENTOR(S) : Hanimu Inaba et al.

It is certified that error appears in the above-identified patent and that said Letters Patent is hereby corrected as shown below:

Column 1, line 61, "nonvolatile" should be --non-volatile--.

Column 7, line 32, delete "in" (first occurrence).

Column 13, line 43, after "device; and" begin new paragraph with "wherein".

Signed and Sealed this

Thirteenth Day of December 1983

[SEAL]

Attest:

GERALD J. MOSSINGHOFF

Attesting Officer

Commissioner of Patents and Trademarks